I. Van Kersen,
Portable Fence,
No. 78,622.    Patented June. 2, 1868.

Witnesses:
Rollin Wood
A. A. Knappen

Inventor:
Izaak van Kersen

United States Patent Office.

IZAAK VAN KERSEN, OF KALAMAZOO, MICHIGAN.

Letters Patent No. 78,622, dated June 2, 1868.

IMPROVED MODE OF CONSTRUCTING LOOSE PRAIRIE-FENCES.

*The Schedule referred to in these Letters Patent and making part of the same.*

TO ALL WHOM IT MAY CONCERN:

Be it known that I, IZAAK VAN KERSEN, of Kalamazoo, in the county of Kalamazoo, and State of Michigan, have invented a new and improved Mode of Constructing Loose Prairie-Fences; and I do hereby declare that the following is a full and exact description of the construction of the same, reference being had to the annexed drawings, making a part of this specification, in which—

Figure 1:
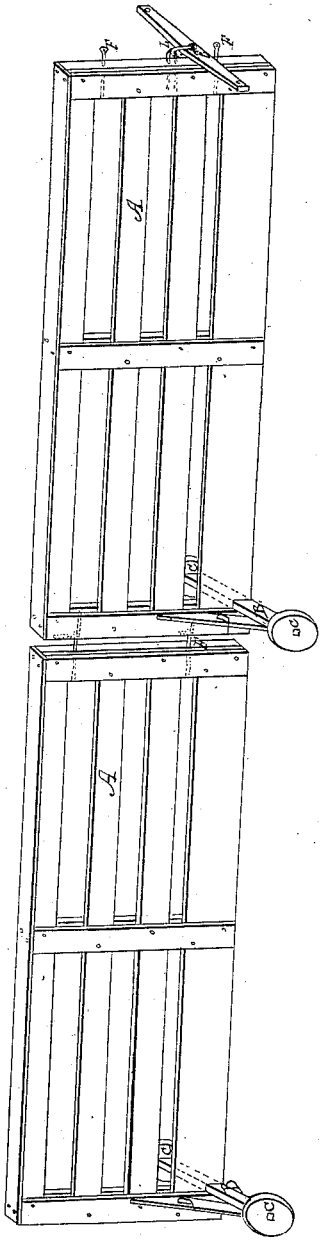
Figure 4:
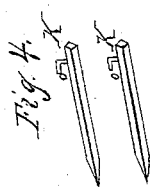
Figure 3:
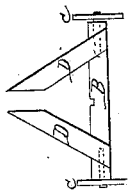
Figure 2:
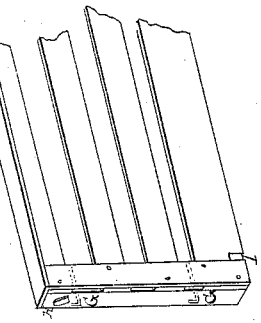

Figure 1 is a perspective view from the whole invention.
Figure 2 is a part from the fence.
Figure 3 is the axle-tree, with wheels, &c.; and
Figure 4 are two fastening-posts.

A A, fig. 1, are two lengths from a common loose fence, which rest on the axle-trees B B, and wheels C C C, and braces D D. The lengths from this fence are fastened by loose eye-bolts, F F F F, which will move by rising or falling from the ground, and are fastened in hooks, shown, fig. 2, G G, and locked up with a wooden lock, H; and by $i$ is shown the excavation in the fence for the axle-tree B, fig. 3, shown behind, with its braces D D and wheels C C.

By hitching two horses to the two-horse evener E, fig. 1, which is fastened with two clevises, L L, to the fence, it can be drawn by ten or twenty lengths together. And to fasten these fences to the ground on its place, drive the hook-posts K K, fig. 4, close by the fence, in the ground, with the iron hooks $o$ $o$ over the axle-trees B B, and it is fastened to the ground.

What I claim as my invention, and desire to secure by Letters Patent, is—

Constructing a fence with wheels and axles permanently attached to one end of each panel, while the other end is connected by hooks and eyes, and the panels supported by braces D D, the whole constructed, arranged, and operated substantially as and for the purpose set forth.

IZAAK VAN KERSEN.

Witnesses:
   ROLLIN WOOD,
   A. A. KNAPPEN.